Figure 1:
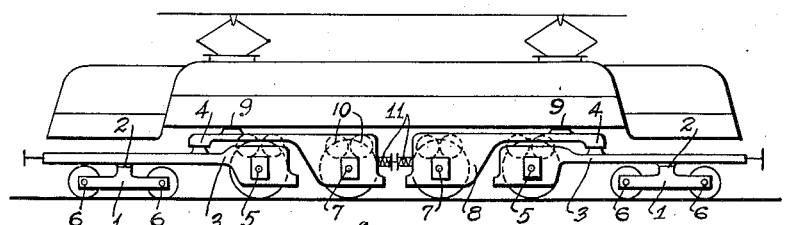

Jan. 30, 1940.  W. A. GIGER  2,188,749

LOCOMOTIVE

Filed Oct. 31, 1938

INVENTOR.
Walter Adolph Giger,
BY
Benjamin Roman
ATTORNEY.

Patented Jan. 30, 1940

2,188,749

UNITED STATES PATENT OFFICE 2,188,749

LOCOMOTIVE

Walter Adolph Giger, Zurich, Switzerland, assignor to Maschinenfabrik Oerlikon, Oerlikon, Switzerland, a corporation of Switzerland Application October 31, 1938, Serial No. 237,808
In Switzerland November 1, 1937

7 Claims. (Cl. 105—175)

Devices are known in the railroad industry which permit the driving axles to adjust themselves radially to a certain degree when the locomotive passes a curve. However, most arrangements used at the present time suffer from certain limitations, the driving motor being for example mounted on the locomotive frame in a fixed position, which makes possible only a limited axial adjustment on account of the coupling required for the transmission of the turning moment; or the radial adjustment is limited because the driving wheels would otherwise touch the frame in the case of the locomotive frame having an inward or outward position. In order to permit the above-mentioned conditions and to avoid a limitation of the radial adjustment, the constructor is on the other hand forced to make the total distance between the wheels of the driving axles as small as possible.

The present invention makes it possible to avoid the above mentioned defects and limitations and to create besides several desirable properties for vehicles running on tracks.

The invention concerns a locomotive possessing at least two articulated driving bogie frames and an arrangement for the radial adjustment on curves of the guiding bogies of the driving axle, the lateral deflection of guiding axles adjusting at least one bogie frame provided with at least one driving motor.

The attached diagrammatical drawing shows three examples of embodiment of the subject matter of the invention.

The first example of embodiment (Figs. 1 and 2) shows a locomotive with two two-axled bogie frames 1 and 4 driving axles (5, 5; 7, 7) of driving frames 3, 3 and 8, 8 respectively. On each bogie frame 1 there is mounted, on the pivot 2, a driving frame 3. The coupling and buffing members of the locomotive are arranged on the driving frames 3. Each of the driving frames 3 is provided with a driving frame 8 articulated to the driving frames 3 and 4. The body of the locomotive rests on the driving frames 8 at the pivots 9. Each driving frame is furnished with two motors, which may be mounted in a fixed position in the driving frame (frame motor) or may take the form of axle motors. Fig. 2 shows the driving frames of the locomotive represented in Fig. 1 on a curve.

Figure 2:
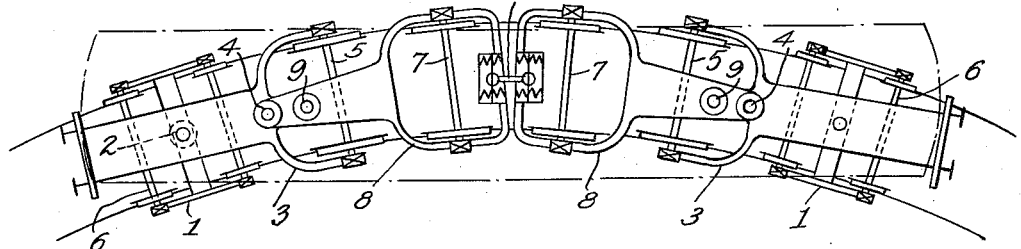
Figure 3:
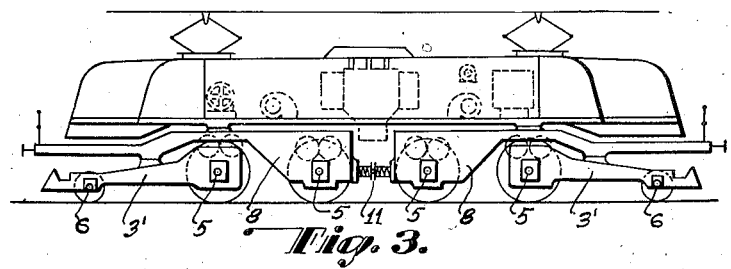

In the embodiment shown in Fig. 3 the trailing bogie frames 1 having 2 axles shown in Fig. 1 are replaced each by a single trailing axle 6 of the driving frames 3'.

Figure 4:
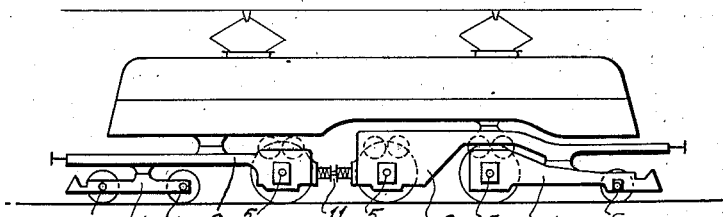

The locomotive of the embodiment shown in Fig. 4 possesses three driving axles 5 of the driving frames 3, 3', 8. The driving frame 3 is articulated to a two-axle trailing bogie frame 1; on the other hand, the driving frame 8 is articulated to the driving frame 3', which has only one trailing axle 6.

The subdivision of the locomotive driving frame into several articulated frames offers several advantages. When such a locomotive leaves a straight track to enter a curve (Fig. 2) the following occurs. As soon as the first trailing axle 6 enters the curve, the pivot 2 of the corresponding bogie frame 3 also moves in the direction of the deflection. Now, this causes the first driving frame 3 to be guided so as to adjust the driving axle 5 likewise for running on the curve. The farther the guiding frame 1 runs on the curve, the more it prepares the first driving axle 5 for running on the curve, this taking place in such a manner that when this axle runs into the curve it does not run against the outer or perhaps the inner rail at a sharp angle, but more or less tangentially. Just as the first driving axle 5 was prepared for running in the curve, the next driving axle is also prepared for the curve in consequence of the deflection of the pivot 4, the bogie frame 8 being also deflected. Fig. 2 shows clearly how flexibly the locomotive represented can adjust itself to the curve. Consequently, a locomotive provided with guided driving frames will exhibit a much smaller curve resistance than single-frame and bogie frame locomotives, and will cause much less wear and tear in wheel rims and rail heads, a point of great importance. The arrangement of the pivots 2—4 and 9 described above has the further advantage that all trailing and driving axles take part in receiving the centrifugal force of the locomotive in the curves, these forces thereby decreasing considerably per axle in comparison with locomotives in which such an adjustment is not possible and in which as a rule only part of the total number of axles guide the vehicle in the curve, which together with the above described radial adjustment of all axles of the vehicle results furthermore in a small degree of wear of the wheel flange and rails in the curves. Therefore, such locomotives are especially adapted to sections having many curves. However, this locomotive is also particularly suitable for high speeds. It will be seen from the drawing that all driving bogie frames are provided with long guiding arms, the effect of this being that the frames can not execute any rapid oscillations, as is the case with bogie frames with a short distance between wheels. The length of guide of the driving frame 3 (Fig. 1), for example, is the distance from the center of the axle 5 to the support at point 2. In the case of the driving frame 8, the length of guide is the distance from the axle 7 to the support at point 4.

As each of the driving guiding frames of the front half of the locomotive is supported at a point located in front of the driving axle in the direction in which the locomotive is running, and as there is thus a comparatively long guide arm for the bogie frame, such a locomotive shows excellent running properties for the front half of the locomotive. The first driving axle of the rear half of the locomotive is moreover connected to the last driving axle of the front half of the locomotive by means of an elastic coupling 11, thus providing for good guidance in this case also.

However, the locomotive may also be constructed with a number of single-axle driving bogie frames for running in one direction only, which arrangement results in very good running properties for forward driving for the whole vehicle. For the purpose of running backwards such a vehicle could be used only for limited speeds. Such a locomotive would be very desirable, for example, for rapid driving, it being turned around if the driving direction is to be changed. This would not mean a great disadvantage, as such rapid driving occurs mostly only on long runs, the time required for turning being of no importance.

With respect to the body of the locomotive, supported at points 4—4 on the underframes, conditions are different from those obtaining in single-frame locomotives. The guiding points of the locomotive frame are very wide apart, resulting in this respect too in a great guided length, which on the other hand finds expression in a long period of oscillation transversely to the track.

Concerning the guiding points 4 and 9 it must be pointed out that they need not also be load points at the same time. In order to obtain a definite distribution of load on the trailing and driving axles, these points may also be utilized merely for the guiding of the driving frames and the locomotive body, while special lateral elastic supporting points may be arranged for transmitting the load. This makes it possible to obtain any desired distribution of load on the locomotive axles. Consequently the load supporting points need not coincide with the articulation points 4 and 9.

The construction of the locomotive also shows that the tractive and impelling forces are transmitted from the driving axles by the axle-boxes immediately to the guiding bogie frames and by these, by means of a single articulating point 4, to the guided driving bogie 3 carrying the tractive and impelling members. The traction and pushing members are advantageously arranged on the guided driving bogie 3 in Fig. 1, or 3 and 8 in Fig. 4, as in that case they do not diverge so much from the central line of the track when the locomotive runs in a curve, as would be the case with a single-frame locomotive. The reason for this is that the guiding point 2 and the axle 5 of these bogie frames run practically, in relation to the track, in the middle of the latter, the deflection of the buffers and couplings thus being likewise not great.

As the driving motors of all driving axles are supported by way of the springs of each driving guided bogie frame immediately on the axles, or with about half their weight immediately on the axles in the case of axle motors, the bogie frames are comparatively light in weight, since they need to support only the tractive and impelling forces and the weight component due to the locomotive body. Since all the driving motors rest on the driving frames, the frame of the locomotive body must carry, in the case of a single-phase locomotive for example, in addition only the transformer, control apparatus and some auxiliary apparatus or, in the case of a direct current locomotive, the starting and control apparatus, etc., which makes it possible to employ a correspondingly light construction. Moreover, the tractive and impelling forces are not transmitted by way of the frame of the locomotive body, but directly through the pivots of the driving bogie frames and the elastic coupling 11 between the two halves of the locomotive.

The construction shown in all the figures of the drawing shows that the linked driving bogie frames 3 and 8 are pivoted together at three points formed by the two supporting pivots 9, 4 of the series of wheels and the pivot 2 by which the driving frame 3 is led. This together with the selectable arrangement of the points of transmission of vertical loads mentioned in the preceding lines, makes it possible to obtain an ideal distribution of the axle load, which does not change during the running of the vehicle.

The natural result of the arrangement of the articulated bogie frame that has been shown is the possibility of constructing locomotives with several guided driving axles having much longer distances between the wheels than is possible with the known constructions, owing to the limitations mentioned at the beginning. The guided driving bogie frames of the locomotives described may adjust themselves freely without any lateral limitations, which is possible only to a very restricted extent in single-frame as also in most bogie frame locomotives on account of the fact that motor starting devices or the frame must be taken into consideration.

Of course, locomotives with guided driving axle bogie frames may also be constructed unsymmetrically according to Fig. 4 without changing thereby the essential features explained in the preceding lines.

It will be immediately clear that the electric driving motors may be replaced by other well-known motor engines, as for example steam piston machines or steam turbines, which transmit their turning moment to the driving axles by means of known driving systems, without thereby changing the principle of the arrangement.

Variations may be resorted to within the scope of the invention, and portions of the improvements may be used without others.

Having thus described my invention, I claim:

1. An electric railroad locomotive having a body provided with a pair of first bogie frames coupled to each other, a pivot for each of said frames joining the frame to said body and said pivot supporting said body, each of said frames having a single axle with a motor for driving said axle, each of said frames having a second bogie frame pivoted thereto, each of said second frames having a single axle and a motor for driving its axle, and each of said second frames having a two-axled bogie frame pivoted thereto.

2. An electric railroad locomotive having a body provided with a first bogie frame, a pivot for said frame joining the frame to said body and said pivot supporting said body, said frame having a single axle with a motor for driving said axle, a second bogie frame pivoted to said frame, said second frame having a single axle with a motor for driving its axle, and a two-axled bogie frame pivoted to said second frame.

3. An electric railroad locomotive having a body provided with a pair of first bogie frames coupled to each other, a pivot for each of said frames joining the frame to said body and said pivot supporting said body, each of said frames having a single axle with a motor for driving said axle, each of said frames having a second bogie frame pivoted thereto, each of said second frames having a single axle with a motor for driving its axle, each of said second frames having a two-axled bogie frame pivoted thereto, and each of said second frames carrying a buffer and coupling device.

4. An electric railroad locomotive having a body provided with a first bogie frame, a pivot for said frame joining the frame to said body and said pivot supporting said body, said frame having a single axle with a motor for driving said axle, a second bogie frame pivoted to said frame, said second frame having a single axle with a motor for driving its axle, a two-axled bogie frame pivoted to said second frame, and said second frame carrying a buffer and coupling device.

5. An electric railroad locomotive having a body provided with a pair of first bogie frames situated at a location between its ends, a pivot for each of said frames joining the frame to said body and said pivot supporting said body, each of said frames having a single axle with a motor for driving its axle, each of said frames having a second bogie frame pivoted thereto, each of said second frames having a single axle with a motor for driving its axle, and each of said second frames having a two-axled bogie frame pivoted thereto.

6. An electric railroad locomotive having a body provided with a pair of first bogie frames situated at a location between its ends, a pivot for each of said frames joining the frame to said body and said pivot supporting said body, each of said frames having a single axle, each of said frames having a second bogie frame pivoted thereto, each of said second frames having a single axle, and each of said second frames having a two-axled bogie frame pivoted thereto.

7. An electric railroad locomotive having a body provided with a first bogie frame, a pivot for said frame joining the frame to said body and said pivot supporting said body, said frame having a single axle, a second bogie frame pivoted to said frame, said second frame having a single axle, and a two-axled bogie frame pivoted to said second frame.

WALTER ADOLPH GIGER.